United States Patent [19]

Gagnon et al.

[11] 3,951,275

[45] Apr. 20, 1976

[54] BLOCK CUBING ASSEMBLY PARTICULARLY FOR CONCRETE BLOCKS

[76] Inventors: Pierre Gagnon, 5637 Wilderton Ave.; Pierre LaForest, 1945 Bruxelles St., both of Montreal, Quebec, Canada

[22] Filed: Sept. 4, 1974

[21] Appl. No.: 502,922

[52] U.S. Cl. .............................. 214/6 C; 214/1 Q; 214/1 BD; 214/6 A; 198/106; 214/6 N
[51] Int. Cl.² ......................................... B65G 57/00
[58] Field of Search ............ 214/6 A, 6 P, 1 Q, 1 R, 214/6 F, 6.5, 1 B, 1 BC, 1 BD, 6 C, 6 N; 198/243, 106, 20 R; 294/62

[56] References Cited
UNITED STATES PATENTS

| | | | |
|---|---|---|---|
| 2,614,880 | 10/1952 | Berchem, Jr. et al. | 294/62 |
| 3,303,942 | 2/1967 | Thomas et al. | 214/1 Q X |
| 3,388,815 | 6/1968 | Lingl | 214/6 F X |
| 3,480,161 | 11/1969 | 6.5 X | 214/6 S X |

Primary Examiner—Frank E. Werner

[57] ABSTRACT

An assembly adapted to form the standard cubes of concrete blocks conventionally used in the construction industry, or similar stacked arrangements of blocks and which includes conveyors, a block receiving movable table, a shelf leading to the latter, a pusher device to push blocks in position on the table, jaws tilting mechanisms to tilt the blocks on one of the conveyors, an actuation device to reciprocatively displace the table to and fro relative to this one conveyor, and a shifting mechanism constructed and positioned to pick up a layer of tilted blocks from the one conveyor and to transfer the same layer on the other conveyor in either of two orthogonally related directions to superpose the required layers of blocks in the required directions relative one to another.

3 Claims, 13 Drawing Figures

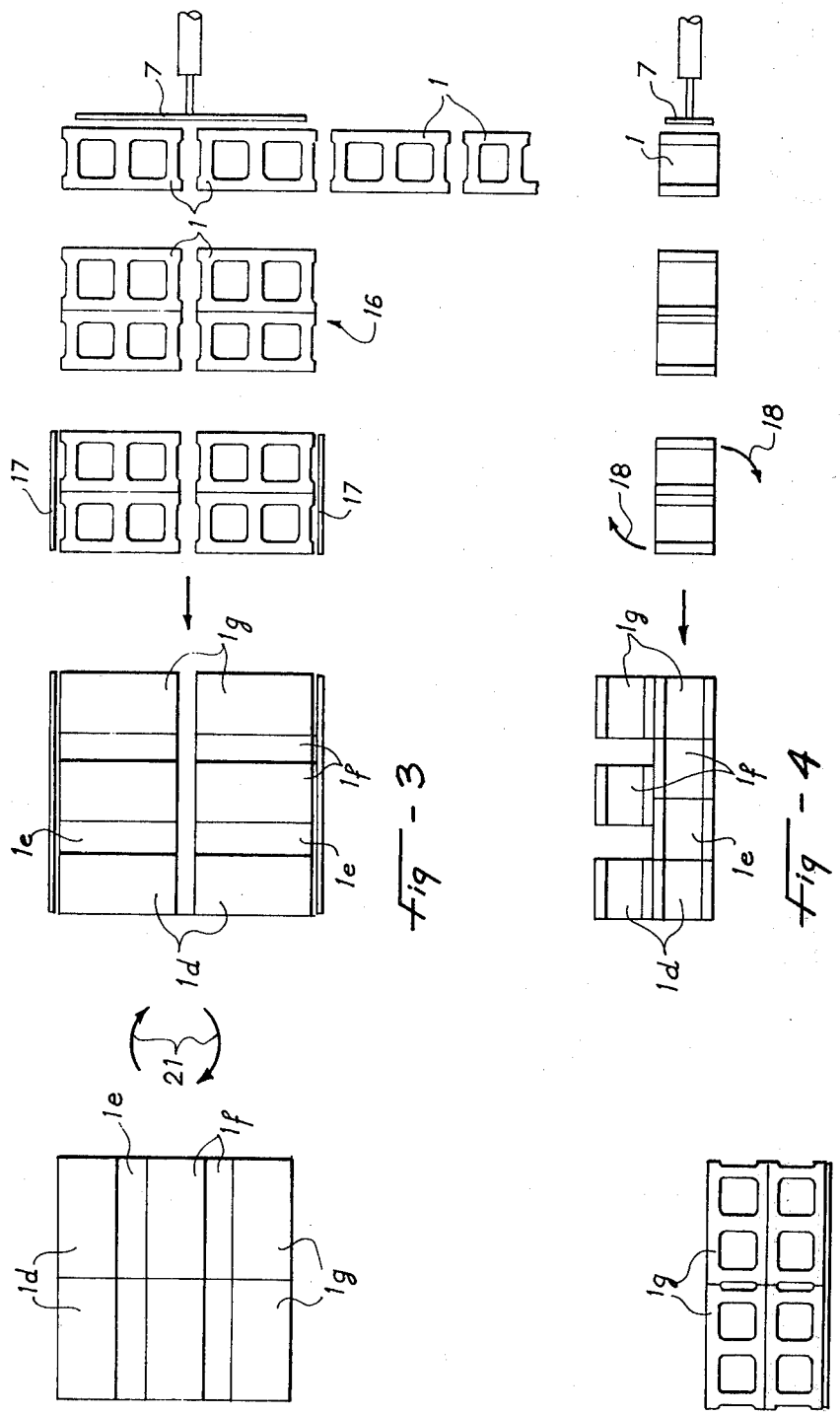

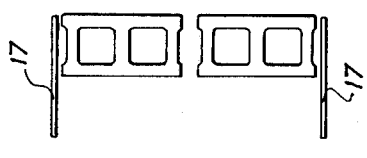
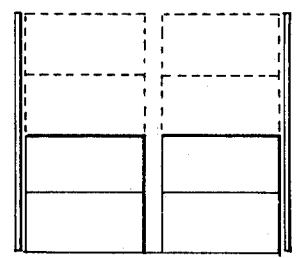
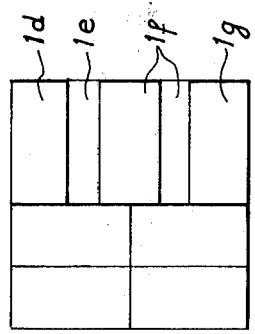
Fig. 5
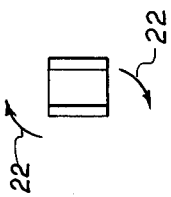
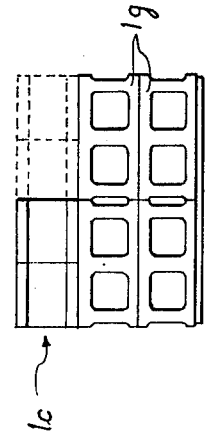
Fig. 6

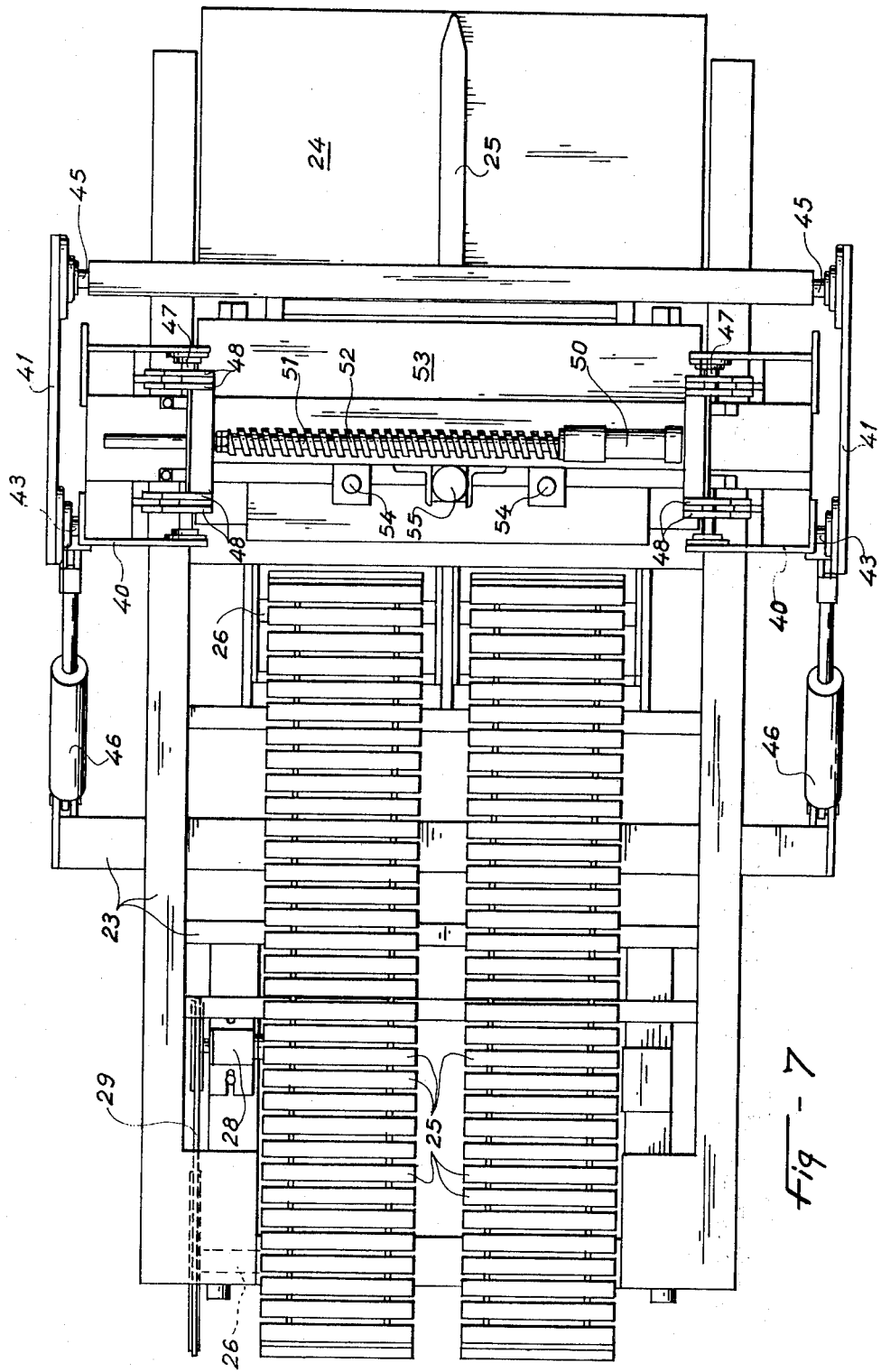

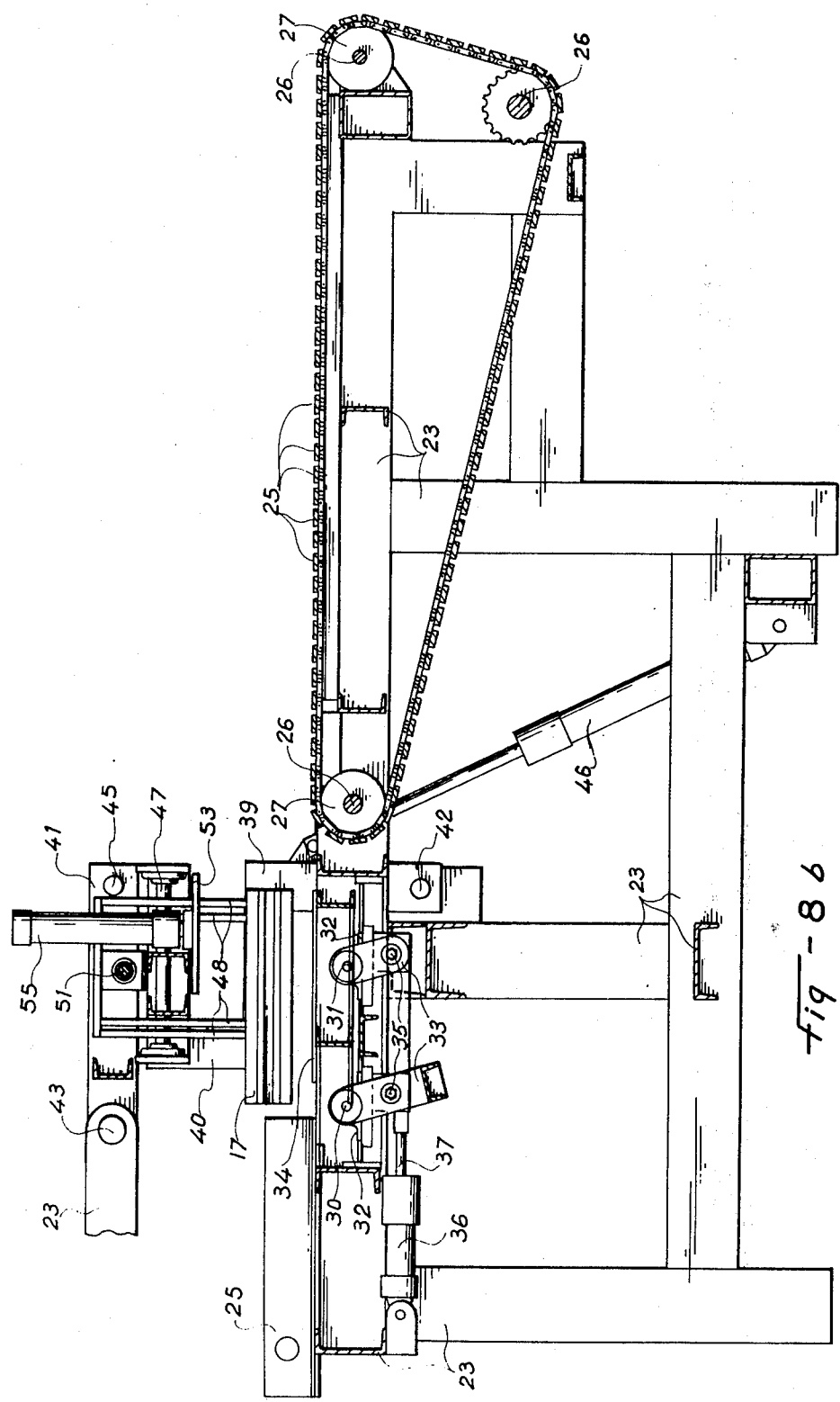

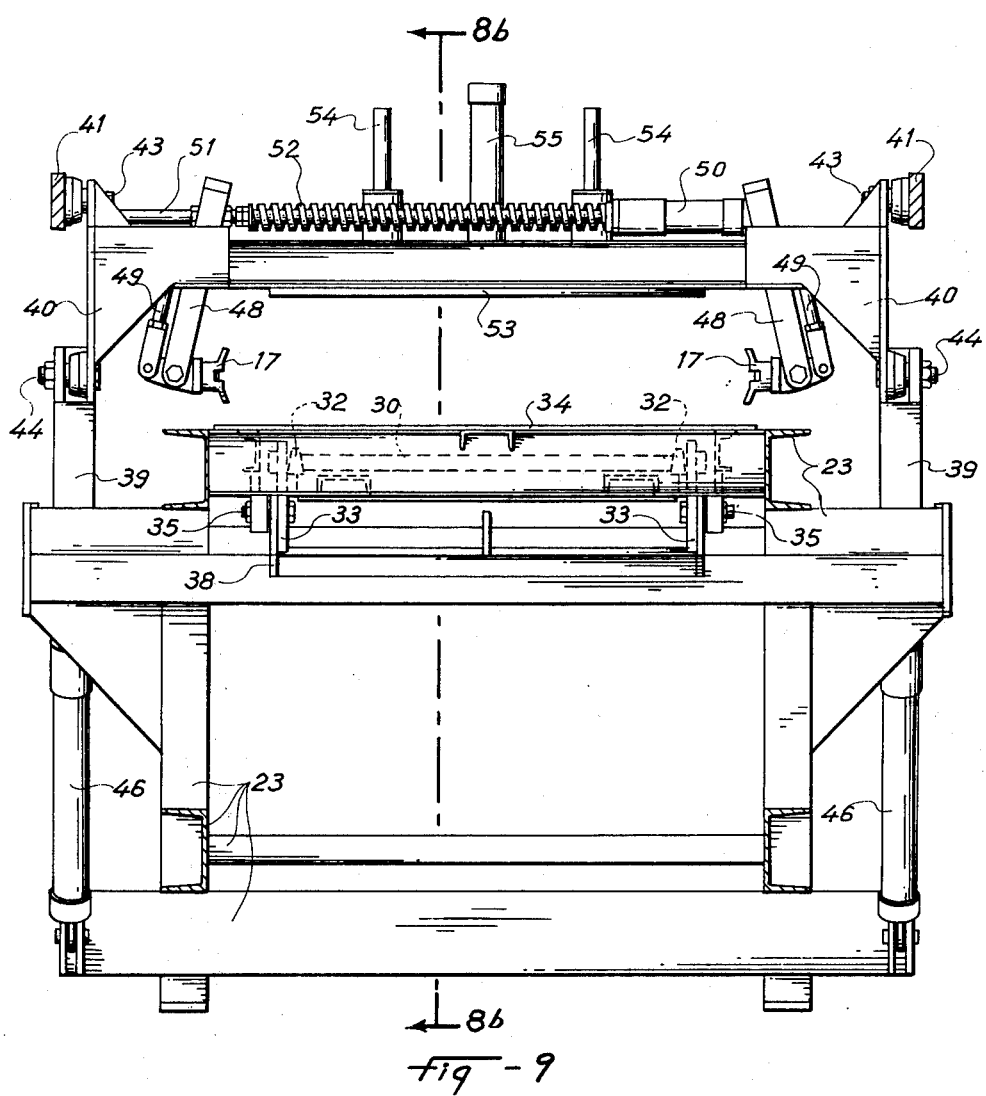

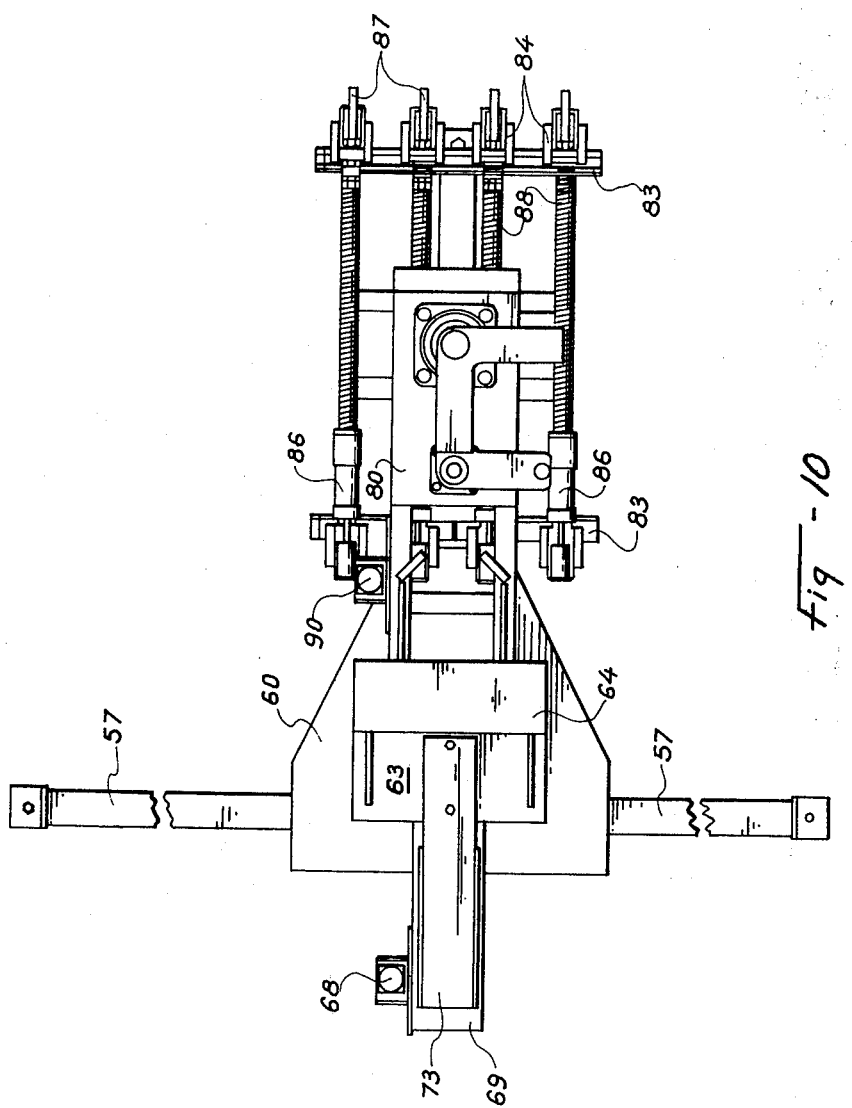

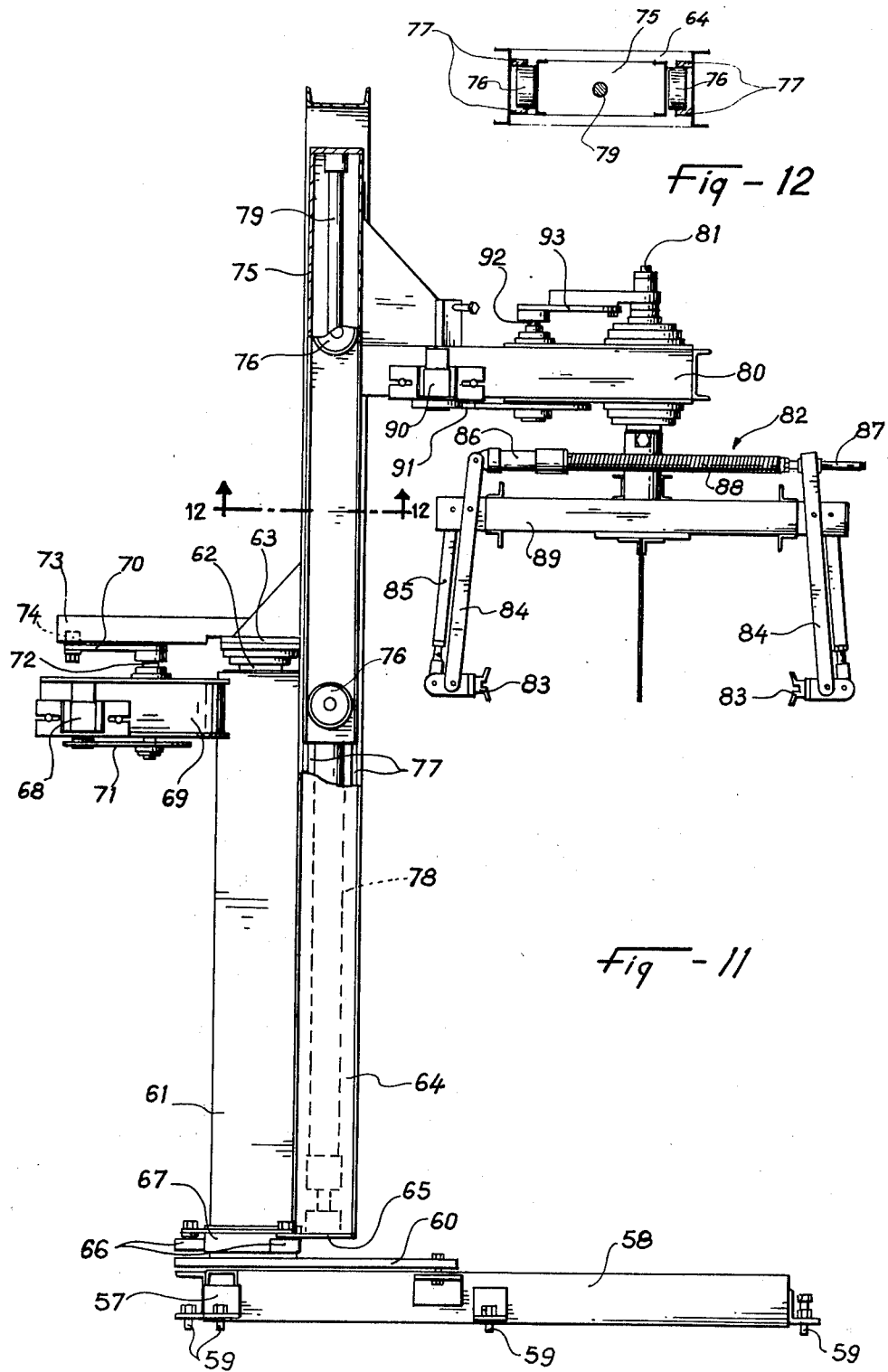

BLOCK CUBING ASSEMBLY PARTICULARLY FOR CONCRETE BLOCKS

This invention relates to blocks handling and, more particularly, to an assembly of the type adapted to stack blocks of concrete in a standard cubical arrangement.

The conventional concrete blocks, which are currently used such as to form foundations and walls of buildings, are now commonly transported in standard stacks or cubical arrangements for convenience in transportation to the construction site and handling at the latter. Such cube of concrete blocks essentially includes a plurality of layers of blocks aligned in two orthogonal directions and all laid on one side one over another.

It is a general object of the present invention to provide an assembly which is particularly adapted to mechanically handle blocks and stack them in a predetermined arrangement, and in particular to efficiently stack concrete blocks for standard cubing thereof.

It is a more specific object of the present invention to provide a block cubing assembly which includes efficient and practical mechanisms to achieve turnover or tilting of the blocks and swinging of layers of tilted blocks, as required to form the standard cubes of concrete blocks.

The above and other objects and advantages of the present invention will be better understood in the light of the following detailed description of a preferred embodiment thereof which is illustrated, by way of example, in the accompanying drawings, wherein:

FIGS. 3 and 4 are sequential plan and side views respectively of the path and operations gone through by the blocks in the cubing process according to the present invention;

FIGS. 5 and 6 are plan and side views respectively illustrating the turnover or tilting of concrete blocks according to the present invention;

FIG. 7 is a top view of the turnover mechanism according to the present invention;

FIG. 8b is a longitudinal section through the turnover mechanism as seen along line 8b—8b in FIG. 9;

FIG. 9 is a cross-section through the turnover mechanism as seen along line 9—9 in FIG. 8a;

FIG. 10 is a top view of the swinging mechanism according to the present invention; and FIG. 11 is a side view of the swinging mechanism as seen from the bottom in FIG. 10; and FIG. 12 is a cross-section taken along line 12—12 of FIG. 11.

Figure 1:
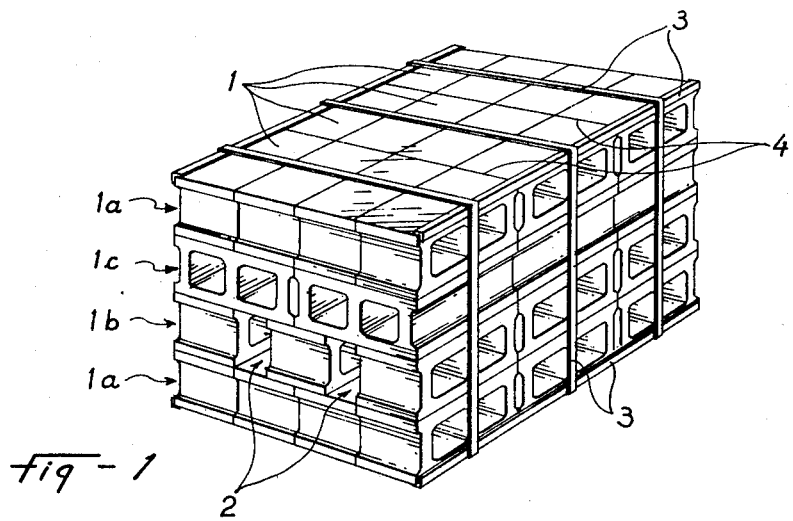
FIG. 1 is a perspective view of a standard cube of concrete blocks as may be formed with the block cubing assembly of the present invention.
Figure 2:
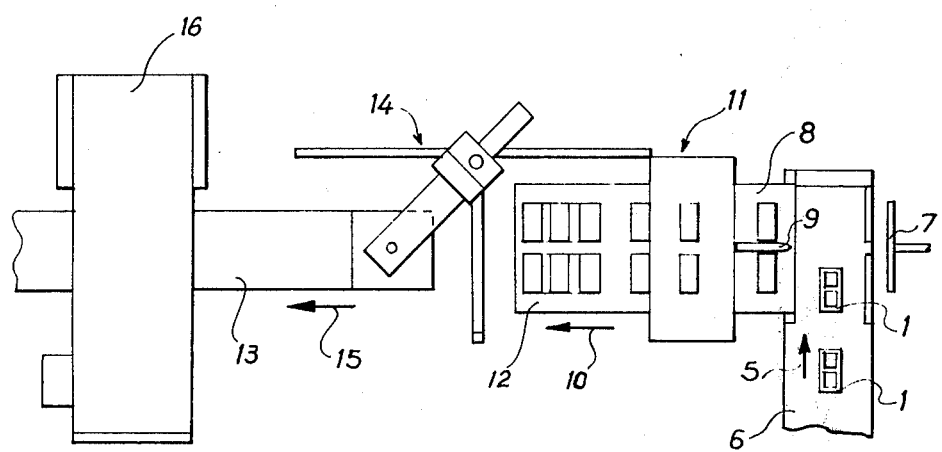
FIG. 2 is a schematic plan view of the layout of the block cubing assembly according to the present invention.

The block cubing assembly according to the present invention is particularly conceived to form a cube of concrete blocks, as shown in FIG. 1. Such cube is now commonly used in the construction industry for convenient handling of the concrete blocks. The cube typically includes four layers of concrete blocks 1, all of which are laid or tilted on one side one over another. The outer layers 1a and 1a include each 12 blocks arranged in 4 adjoining rows. The second layer 1b from the bottom only includes 9 blocks 1 to allow for parallel spaces 2 between the three rows thereof. These spaces are used for insertion of the fork of a fork lift truck therein and corresponding handling and transportation of the cube. The third layer 1c from the bottom is formed of only two rows but with the blocks 1 thereof extending lengthwise orthogonally to the blocks of the layers 1a, 1a, and 1b. The formation of the aforementioned cube of concrete blocks is completed by appropriate strapping 3 of plastic or any other suitable material. The present invention is not meant to cover the manner nor the material to produce the strapping 3.

It must be noted that the afore-described cube, which is illustrated in FIG. 1, includes three adjoining slices separated by the imaginary upright planes passing through the cracks 4. These slices of blocks may be readily separated one from the other by severing the straps intersecting the afore-mentioned upright planes.

It must also be pointed out that the block cubing assembly according to the present invention directly produces cubes which each comprises only two adjoining slices of blocks. Cubes of more slices are produced by appropriate strapping, the details of which fall outside the scope of the present invention.

The concrete blocks which have been adequately cured are allowed to proceed in succession in the direction of the arrow 5 on a conveyor 6, of any suitable type, such as by gravity on a roller conveyor. When a pair of successive blocks 1 have reached a predetermined position, a pusher device, schematically represented by a pusher plate 7, slides these two blocks laterally off the conveyor 6 onto a reception shelf 8 where they are guided in spaced-apart relationship by a central elongated guide 9. As will be explained later in more details, the blocks from the shelf 8 are caused to proceed farther in the direction of the arrow 10 successively by tilting by a turnover mechanism, at 11, and by travelling on an endless conveyor 12.

Another conveyor 13 is arranged in aligned edgewise adjoining relationship with the endless conveyor 12 but is at a lower level than the latter. A swinging mechanism 14 is installed in predetermined relationship relative to the adjacent ends of the conveyors 12 and 13. The swinging mechanism 14 includes a swinging arm unit which is horizontally swingable about an upright axis for overlying relationship with either of the two conveyors 12 and 13 and which is adapted to pick up one or two layers of arrayed blocks on the conveyor 12 and transfer the same to the other lower conveyor 13, as will be described in details later. The layers of blocks placed on the conveyor 13 are transported by the latter in the direction of the arrow 15 for passage in registry with a strapping machine 16, of any suitable construction, to apply the strapping 3.

The sequential operations carried out by the block cubing assembly of the present invention are illustrated in FIGS. 3, 4, 5, and 6 and will now be described in details. The concrete blocks 1 travel on the conveyor 6 in upright position, that is with the apertures therein extending upwardly. When a pair of successive blocks 1 arrive in alignment with the pusher plate 7, the latter is actuated and displaced toward the turnover mechanism to place these two blocks at a block receiving station defined by this turnover mechanism. A second pair of blocks 1 may be pushed into lateral engagement against the preceding pair. The first step of the cubing operations includes such juxtaposition of two pairs of blocks as shown at 16 in FIG. 3. These blocks positioned at the block receiving station are then engaged by a pair of spaced-apart jaws 17 and tilted or turned over in the direction of the arrows 18, such that the tilted blocks now rest on one side, one over the other, such as for instance the blocks 1d in FIGS. 3 and 4. It must be pointed out that the turnover mechanism is also adapted to tilt or turn over only one pair of blocks at the time, as shown by the arrows 22 in FIG. 6. In fact, the blocks 1e are so tilted in single pairs and pushed against the blocks 1d. The blocks 1f are then positioned at a block tilted station by first being tilted together like the blocks 1d and by thereafter pushing on the pair of overlying 1f to offset the same relative to the underlying blocks 1f to form the spaces 2. The next operation consists in positioning two other pairs of tilted blocks 1g against the underlying blocks 1f by the same tilting as for blocks 1d and 1f. Thereafter, the layer 20 of arrayed blocks 1d–1g is picked up from the block tilted station and pivoted one-quarter turn, as indicated by the arrows 21, to be rested at a cubing station at 90° relative to the direction which it had at the preceding station. It may thus be seen that the adjacent layers 1a and 1b of FIG. 1 are formed simultaneously as a single layer.

The layer 1c is more simply formed by successively tilting four separate pairs of blocks 1, as shown by the arrows 22, forming a layer with the four contacting pairs of blocks at the block tilted station, and thereafter merely transferring this layer 1c onto the layer 1a–1b without swinging thereof such that the blocks thereof extend lengthwise at 90° relative to the underlying blocks 1d to 1g. The last or top layer 1a is formed like layer 1c, but with 90° swinging thereof.

Other intermediate layers, such as 1a–1b and 1c, could be added, if desired, without any change to the cubing assembly nor to the operations involved to produce any particular layer.

The block cubing assembly according to the present invention includes a support constituted of a framework 23, of rolled stock and more precisely channel members. A shelf 24 is fixedly secured to the framework 23 at one end thereof and in edgewise adjoining relationship with on side of the roller conveyor 6. A central guide 25 is secured on the shelf 24 and projects longitudinally and centrally respective to the opposite lateral edges of the latter.

An endless conveyor is supported by the framework 23 and includes a pair of laterally spaced-apart tracks having transverse slots 25, shafts 26 and sprockets 27 rotatably mounting the endless tracks relative to the supporting framework, and a motor 28 and a belt 29 to drivingly operate this conveyor. The latter, as clearly seen from the drawings, is aligned with the shelf 24 and the central guide 25 in spaced-apart relationship therewith.

A pair of transverse shafts 30 and 31 are carried by pillow blocks 32 fixedly secured relative to the framework 23, such as to define a pair of transverse axes which are fixed relative to the framework. A pair of levers 33 is pivotally supported by each of the transverse shafts 30 and 31 and a movable table 34 is pivotally connected and suspended at 35 to these levers. A hydraulic cylinder unit is provided to reciprocatively displace the table 34 edgewise to and fro relative to the shelf 24 and the top run of the slat conveyor. This hydraulic cylinder unit includes a cylinder 36 pivotally secured to the framework 23 and a piston rod 37 extending longitudinally of the slat conveyor and secured to a member 38 interconnecting the levers 33 in predetermined parallel relationship.

The table 34 has a top surface forming a block receiving station and the top run of the slat conveyor forms a tilted block station. There will now hereinafter be described in details the afore-mentioned turnover mechanism which is adapted to tilt or turn over one or two pairs of blocks at a time from the block receiving station to the tilted block station.

The turnover mechanism includes a frame comprising a lower section 39, an intermediate section 40 and a top section 41. The lower frame section 39 includes a pair of lateral legs pivoted to the framework 23 about a transverse axis defined by transversely aligned pivot pins 42. The top frame section 41 is pivoted at one end to the framework 23 about a transverse axis defined by transversely aligned pivot pins 43. The intermediate frame section 40 is pivoted at its opposite ends to the other end of each of the bottom and top sections respectively about transverse axes defined by transversely aligned pivot pins 44 and 45 respectively. A pair of hydraulic cylinder units 46 are pivotally connected at opposite ends to the framework 23 and to the bottom frame section 39. When the frame sections are at rest, as shown in full lines in FIG. 8a, the piston rod of the hydraulic cylinder unit 46 is fully extended. Upon retraction of the piston rod of this unit 46, the lower frame section is caused to pivot about the transverse axis defined by the pins 42 toward the dotted line position, also shown in FIG. 8a. During this pivoting of the frame section 39, the intermediate frame section 40 is displaced upwardly and rotates in a vertical plane through 90° with resulting appropriate pivoting of the top frame section 41 sufficient to allow passage of the intermediate frame section.

The afore-described tilting device defined by the frame sections and the associated parts have the pair of jaws 17 mounted thereon with an associated mechanism to actuate the latter. A pair of rods or shafts 47 are secured to the intermediate frame section 40 and extend lengthwise of the slat conveyor along opposite sides of this frame section. Each jaw 17 is secured to supporting arms 48 which are pivotally supported intermediate their ends by one of the rods 47 and rigidly interconnected for bodily pivoting thereof. Each jaw 17 is pivoted on the lower end of the corresponding supporting arm and is stabilized by a stabilizer bar 49.

A hydraulic actuation or cylinder unit extends lengthwise transversely between the upper ends of the arms 48 and includes a hydraulic cylinder 50 abutting against the arms 48 of one jaw 17 and a piston rod 51 connected to the arms of the other jaw 17. A compression spring 52 is coiled around the piston rod 51 and resiliently biases the upper ends of the levers 43 away from each other, and consequently the jaws 17 toward each other.

A block pusher device is also carried by the intermediate frame section 40 and includes a pusher plate 53 slidably guided by a pair of rods 54 slidable relative to this frame section. A hydraulic cylinder unit has its cylinder 55 secured to the intermediate frame section 40 and its piston connected to said usher plate 53 to actuate the latter.

Figure 8A:
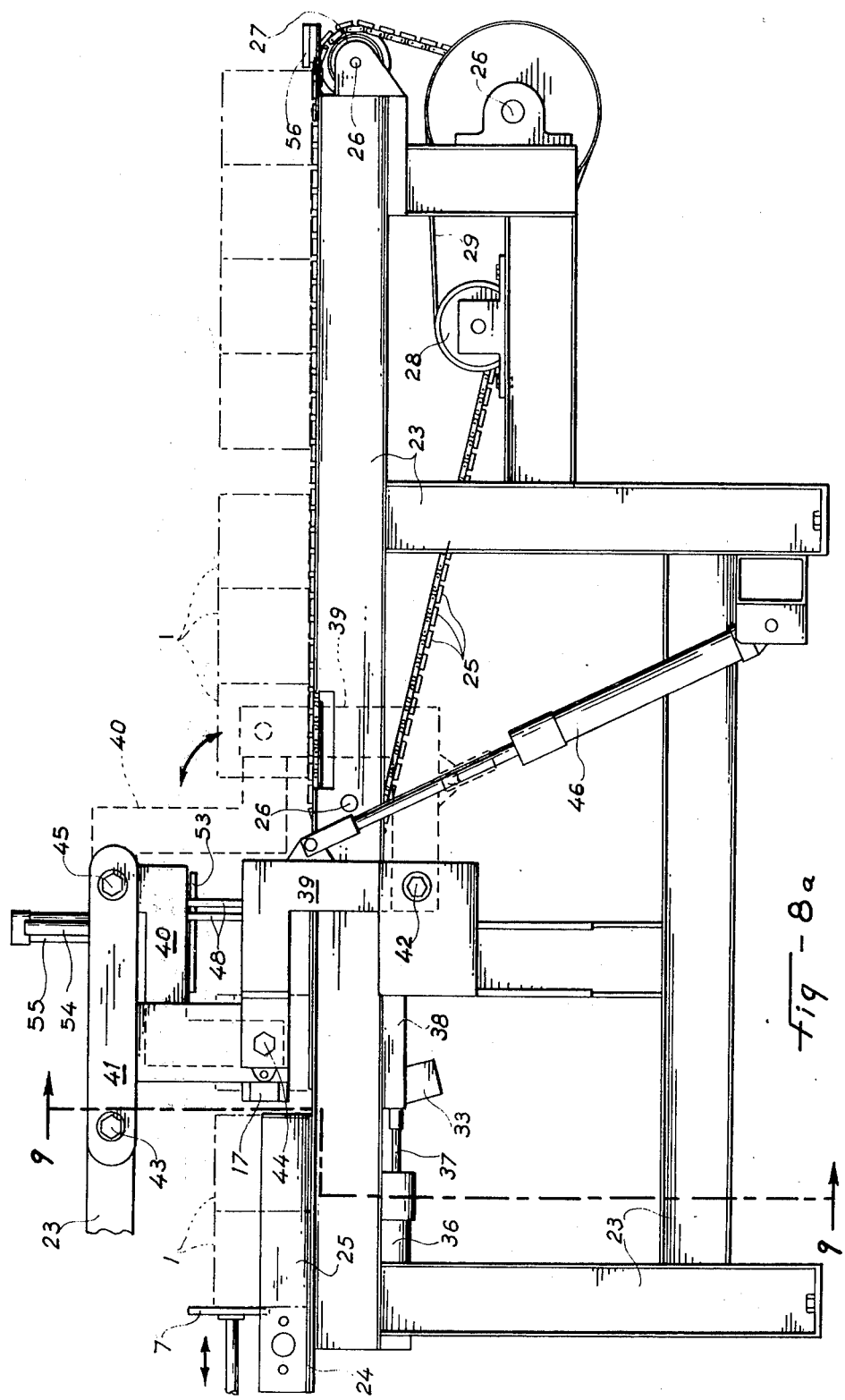
FIG. 8a is a side view of the turnover mechanism as seen from the top in FIG. 7.

After the pusher plate 7 has pushed either one or two pairs of blocks on the table 34, the latter is moved through a circular arc by cylinder 26 from an initial position in which table 34 is in edgewise alignment with and close to the end of receiving shelf 24 to a final advanced position, shown in FIG. 8B, wherein the table 34 is spaced forwardly of shelf 24. Then jaws are actuated by the hydraulic cylinder unit defined by the cylinder 50 and the piston rod 51 to clamp these jaws against the opposite lateral sides of the blocks. The hydraulic cylinder unit 46 is thereafter contracted causing the frame sections 39 and 40 to move to the dotted line position of FIG. 8a. In this latter position, the blocks are now tilted to rest on one side, with the first row of blocks over the second row of blocks if two pairs or rows of blocks are involved. The pusher plate 53 there extends upwardly edgewise on the left side of the blocks but in registry with the overlying blocks only, if any. The pusher plate 53 may then be actuated toward the slat conveyor to cause offsetting of the overlying blocks relative to the underlying blocks, as shown by the blocks 1f in FIG. 6. The mobility of the table 34 is used to separate the two pairs of blocks 1 pushed thereon, from the succeeding blocks on reception shelf 24.

The slat conveyor is provided with a transverse stop or abutment 56 against which the layer of arrayed blocks is held before transfer to the following conveyor 13 by the swinging mechanism 14 of the present invention which will hereinafter be described in details with reference to FIGS. 10 and 11.

The swinging mechanism 14 includes a base formed by rigidly interconnected legs 57 and 58, each provided with at least one levelling screw 59 or any other appropriate levelling expedient. A base plate 60 is fixedly secured onto the legs 57 and 58 and a mast or post 61 is rigidly secured to this base plate and projects upwardly therefrom. A pivot or rod 62 is rotatably mounted in upright position in the post 61 and has a plate 63 rigidly secured thereto and extending transversely thereof for rotation therewith. A rectangular frame 64, formed of a channel member extending around the rectangular outline thereof, is rigidly secured to the plate 63 and projects endwise upwardly adjacent the post 61. The frame 64 includes a bottom plate 65 and rollers or wheels 66 secured to the latter and adapted to rollably guide the lower end of the frame around an annular flange 67 of the fixed post 61. Thus, the frame 64 forms another post section which is swingable about the upright axis defined by the rod 62.

An actuating mechanism is provided to produce the desired one-quarter turn or 90° swinging of the post section represented by the frame 64. This actuating mechanism includes a motor 68 fixed to a supporting flange 69 rigidly secured to the post 61. The motor 68 is drivingly connected to a crack arm 70 through a sprocket drive 71 and an upright shaft 72. An arm 73 is rigidly secured to plate 63 and projects radially outwardly relative to the rod 62. A slot, not shown, is formed into the bottom face of the arm 73 and extends radially relative to the upright axis defined by the rod 62. A roller or wheel 74 is rotatably mounted on the outer end of the crank arm 70 in cam following engagement into the slot of the arm 73. It will thus be readily understood that the unidirectional rotation of the crank arm 70 causes the roller or wheel 74 to roll back and forth along the afore-mentioned slot with a resultant to-and-fro swinging of the arm 73 and the frame 64 relative to the position of the upright shaft 72. By appropriate design, this to-and-fro swinging is made to produce a one-quarter turn or 90° swinging of the post section defined by the frame 64.

A carriage 75 is mounted between the upright portions of the frame 64 and is also of rectangular form defined by a channel shape member extending around the periphery thereof. At least two guide wheels or rollers 76 are secured against the exterior face on each side of the carriage and operatively engage a pair of guide tracks 77 fixed against the inner face of the adjacent upright portion of the frame 64. An actuating hydraulic cylinder unit is provided to control the up- and-down displacements of the carriage 75 and includes a cylinder 78 secured to the plate 65 and a piston 79 projecting inwardly into the carriage 75 and having its free end engaging the closed upper end of the latter.

A swinging arm 80 is fixedly secured to the carriage 75 and projects laterally therefrom in the direction of the leg 58. A shaft 81 is rotatably mounted on the swinging arm 80 for rotation about an upright axis. A jaw assembly 82, of generally the same construction as the one of the turnover mechanism, is suspended to the shaft 81 for rotation therewith. This jaw assembly includes a pair of spaced-apart jaws 83 pivotally suspended by levers 84 and stabilizers 85 and actuated by cylinder 86, piston rod 87, and springs 88. A frame 89 pivotally carries the levers 84 and the stabilizers 85. A motor 90 is provided to swing the jaw assembly 82 about the axis of the shaft 81. A sprocket drive 91 connects the motor 90 to another upright shaft 92 having a crank arm 93 secured thereto for rotation therewith. An arm 94 is secured to the upright shaft 92 to rotate therewith and an arm 95 is secured to the upright shaft 81 to rotate therewith and cause the rotation thereof. The arm 94 is adapted to drive the arm and the jaw assembly 82 a precise one-quarter turn around the upright axis thereof.

The transfer of one or two lawyers of arrayed blocks from the slat conveyor to the other endless conveyor 13 is done by first placing the jaw assembly 82 and the supporting arm 80 in overlying relationship with the layer to be transferred. The hydraulic cylinder unit 78–79 is then contracted to cause the jaws 83 to register laterally with opposite lateral edges of the lower layer of blocks. The jaws are then closed, the jaw assembly 82 and the carriage 75 are elevated, and the swinging post section 64 is pivoted 90° by actuation of the motor 68. The layers of blocks may then be lowered onto the conveyor 13 where it would then stay with the blocks aligned at 90° relative to their alignment on the slat conveyor.

To obtain layer 1c in the right position, then motor 90 is actuated to cancel or compensate the one-quarter turn produced by swinging of the post section 64.

It must be appreciated that numerous details of construction of the afore-described block cubing assembly may be changed without departing from the spirit and scope of the present invention as defined by the appended claims.

What we claim is:

1. In a block cubing assembly, a support, a block receiving table carried by said support, a conveyor carried by said support and aligned with one end of said table for forward movement of its top run away from said table, a receiving shelf carried by said support in alignment with the other end of said table, block pusher means carried by said support over said receiving shelf for pushing forwardly from said shelf onto said table successive transverse rows of blocks contacting one another, a turnover mechanism carried by said support and including on each side of said table a frame section rotatable through 90° in a vertical plane between an initial position and a final position, a transverse frame member rigidly interconnecting said two frame sections above said table, a pair of jaws pivoted on said transverse member and depending from the latter to extend between said transverse member and said table substantially parallel to, and longitudinally, of each side of said table in the initial position of said frame sections, said jaws pivotable for movement towards and away from each other to clamp therebetween, in the initial position of said frame sections, two adjacent transverse rows of blocks positioned on said table by said pusher means and then turn said two rows of blocks through 90° and transfer the same onto said conveyor, the first row of blocks lying on top of the second row of blocks in the final position of said frame sections, and a power-operated pusher plate carried by said transverse frame member for reciprocating movement and in register with said first row of blocks for pushing the same forwardly horizontally over the blocks of the second row to offset the blocks of the first row relative to the blocks of the second row in the final position of the frame sections.

2. In a block cubing assembly as claimed in claim 1, wherein said turnover mechanism includes on each side of said table a bottom lever and a top lever, respectively, pivoted to said support about first and second transverse and horizontal axes below and above said table and forwardly and rearwardly of said table respectively, said frame section being pivotally connected to said bottom lever and to said top lever about third and fourth transverse and horizontal axes respectively, said third axis being located along a radius making a 45° angle with the vertical and extending upwardly and rearwardly relative to said first axis in the initial position of said frame section, said third axis moving forwardly through a 90° arc during movement of said frame section from its initial to its final position, said fourth axis being located vertically above said third axis and at the level of said second axis in the initial and final positions of said frame section.

3. In a block cubing assembly as claimed in claim 1, wherein said table is suspended from said support by a parallelogram link system from reciprocating swinging arcuate movement from an initial rearward position level with and close to the end of said receiving shelf and a final position level with said receiving shelf and forwardly displaced therefrom, said first-named pusher plate pushing said two rows of blocks on said table while the latter is in its initial position, swinging movement of said table causing said blocks on said table to separate from a contiguous row of blocks on said receiving shelf by a forward and downward swinging movement, said jaws in the initial position of said frame section being in register with the two rows of blocks on the table in the final position of the latter.

* * * * *